(12) United States Patent
Park et al.

(10) Patent No.: US 9,264,104 B2
(45) Date of Patent: Feb. 16, 2016

(54) SHARING OF INFORMATION COMMON TO TWO MOBILE DEVICE USERS OVER A NEAR-FIELD COMMUNICATION (NFC) LINK

(71) Applicant: Microsoft Corporation, Redmond, WA (US)

(72) Inventors: Jae Park, Bellevue, WA (US); Karen Luk, Seattle, WA (US); Michael Connolly, Seattle, WA (US); Sogol Malekzadeh, Sammamish, WA (US); John Skovron, Bellevue, WA (US); Matthias Baer, Seattle, WA (US); Monica Gonzalez, San Francisco, CA (US); Jonathan Aroner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 128 days.

(21) Appl. No.: 13/686,133

(22) Filed: Nov. 27, 2012

(65) Prior Publication Data
US 2014/0148094 A1    May 29, 2014

(51) Int. Cl.
*H04B 5/00* (2006.01)
*G06Q 50/00* (2012.01)
(Continued)

(52) U.S. Cl.
CPC .................. *H04B 5/00* (2013.01); *G06Q 50/01* (2013.01); *H04M 1/7253* (2013.01); *H04W 4/008* (2013.01); *H04W 4/206* (2013.01); *H04W 8/186* (2013.01); *H04M 1/72563* (2013.01); *H04W 4/027* (2013.01)

(58) Field of Classification Search
CPC ........................................................ H04B 5/00
USPC ........................................ 455/41.1, 41.2, 466
See application file for complete search history.

(56) References Cited

U.S. PATENT DOCUMENTS 7,847,684 B1    12/2010   Brady, Jr.
7,877,082 B2 *   1/2011   Eagle et al. ................ 455/414.1
(Continued)

FOREIGN PATENT DOCUMENTS

WO       2010/094989 A1    8/2010

OTHER PUBLICATIONS

International Search Report and Written Opinion mailed Mar. 27, 2014, issued in connection with corresponding International Application No. PCT/US2013/072402 (12 pages total).
(Continued)

*Primary Examiner* — Tuan H Nguyen
(74) *Attorney, Agent, or Firm* — Bryan Webster; Judy Yee; Micky Minhas

(57) ABSTRACT

A method for exchanging information between two communication devices includes communicating first identity information from a first communication device to a second communication device over a short-range communication link in response to an event. A second identity is received from the second communication device over the short-range communication link. The first identity information identifies a user of the first communication device and the second identity information identifies a user of the second communication device. Based on the first and second identity information, information is obtained specifying at least one attribute of the first and second users that they have in common.

19 Claims, 4 Drawing Sheets

(51) Int. Cl.
*H04M 1/725* (2006.01)
*H04W 4/00* (2009.01)
*H04W 4/20* (2009.01)
*H04W 8/18* (2009.01)
*H04W 4/02* (2009.01)

(56) References Cited

U.S. PATENT DOCUMENTS

| | | | |
|---|---|---|---|
| 7,962,369 | B2 | 6/2011 | Rosenberg |
| 8,140,014 | B2 | 3/2012 | Liao |
| 8,145,129 | B2 * | 3/2012 | Liu et al. .................. 455/41.2 |
| 8,417,225 | B2 * | 4/2013 | Mock et al. ................ 455/414.1 |
| 8,578,009 | B1 * | 11/2013 | Newstadt et al. ............ 709/223 |
| 2005/0250552 | A1 | 11/2005 | Eagle et al. |
| 2007/0003061 | A1 * | 1/2007 | Jung et al. .................. 380/270 |
| 2009/0156124 | A1 | 6/2009 | Liu et al. |
| 2010/0257239 | A1 | 10/2010 | Roberts |
| 2011/0238755 | A1 | 9/2011 | Khan et al. |
| 2011/0314153 | A1 | 12/2011 | Bathiche et al. |
| 2011/0314168 | A1 | 12/2011 | Bathiche et al. |
| 2012/0019365 | A1 * | 1/2012 | Tuikka et al. ................ 340/10.1 |
| 2012/0117094 | A1 | 5/2012 | Pratt et al. |

OTHER PUBLICATIONS

Kobler, et al., "NFriendConnector: Design and Evaluation of an Application for Integrating Offline and Online Social Networking", Retrieved at <<http://aisel.aisnet.org/cgi/viewcontent.cgi?article=1036&context=thci>>, AIS Transactions on Human-Computer Interaction, vol. 3, Issue 4, Retrieved Date: May 18, 2012, pp. 214-235.

"White Paper Near Field Communication", Retrieved at <<http://www.nokia.com/NOKIA_COM_1/Press/Materials/White_Papers/pdf_files/White%20paper_Nokia_Near%20field%20communication.pdf>>, May 21, 2009, pp. 8.

Thompson, Cadie, "Near field communication the next mobile boost?", Retrieved at <<http://www.usatoday.com/tech/news/story/2012-01-08/cnbc-near-field-communication-mobile/52443756/1>>, Retrieved Date: May 18, 2012, pp. 4.

* cited by examiner

SHARING OF INFORMATION COMMON TO TWO MOBILE DEVICE USERS OVER A NEAR-FIELD COMMUNICATION (NFC) LINK

BACKGROUND

Modern communication networks have provided users with a vast array of features and functions that make staying connected with friends, families, colleagues, and others easy, convenient, and inexpensive. A wide variety of devices such as mobile phones, smart phones, personal computers ("PCs"), and other network-enabled devices are available which let users surf the Web to access sources of information and entertainment, send e-mails and instant messages, as well as communicate using voice calls to other users. Moreover, as wireless infrastructure has broadened its reach, and as devices become feature-rich, smaller, and more portable, users can be reached virtually at any time and at any place.

Many mobile communication devices allow users to exchange their contact information when they meet one another. The exchange can be performed in a variety of different ways. For example, users can exchange contact information with their mobile communication devices over a short-range communication link such as Near-field Communication (NFC), which allows wireless communication over a few centimeters. However, users' contact cards typically reflect static information such as their address, phone number, email address, and similar information, which can be obtained directly from the devices. Moreover, the information contained in contact cards may not be the most pertinent or interesting information users wish to exchange upon first meeting one another.

SUMMARY

A method, system and apparatus is provided which allows two individuals who do not know each to discover attributes or personal information that they have in common upon meeting one another. Such attributes or personal information may include common friends, contacts, hobbies and other interests and so on.

In one implementation, when two mobile communication devices establish communication with each other in response to an event (e.g., a physical "bump") using a Near-Field communication (NFC) protocol or another short-range communication technology, information is exchanged to identify the owners of the devices. Each device may then send the identity information of the owner of the other device to a comparison system over a communications system such as the Internet. The comparison system uses the identifying information of each owner item to search for attributes (e.g., friends, colleagues, interests, hobbies, past work experience, location information, etc.) that the owners may have in common. Such attributes may be available from a variety of sources (e.g., social and professional networking sites, the comparison system itself and the mobile communication devices themselves). The comparison system compares the attributes of both owners to identify attributes that they have in common. The comparison system may then send the matching attributes to each owner's mobile communication device, which presents them to their respective owners.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present technology will now be described with reference to FIGS. 1-5, which in general relate to the exchange of information between a pair of communication devices using a short-range communication protocol such as NFC. Information exchange between two devices may be initiated by a variety of methods. In one example, the pairing of two proximate communication devices may be initiated by "bumping" technology, where the tapping or bumping of one device against another initiates communication between the two devices. In some embodiments the information exchange may begin automatically after communication has been established without any user intervention or only after the exchange of preliminary data such as authentication credentials or the like. In other embodiments, in order to perform the information exchange, after communication has been established, the users employ the communication devices' user interfaces to affirmatively indicate that they approve the exchange of information. In yet other embodiments, some additional action may also be performed by one or both of the users via the communication device to indicate the user's desire to establish communication with the other device.

Figure 1:
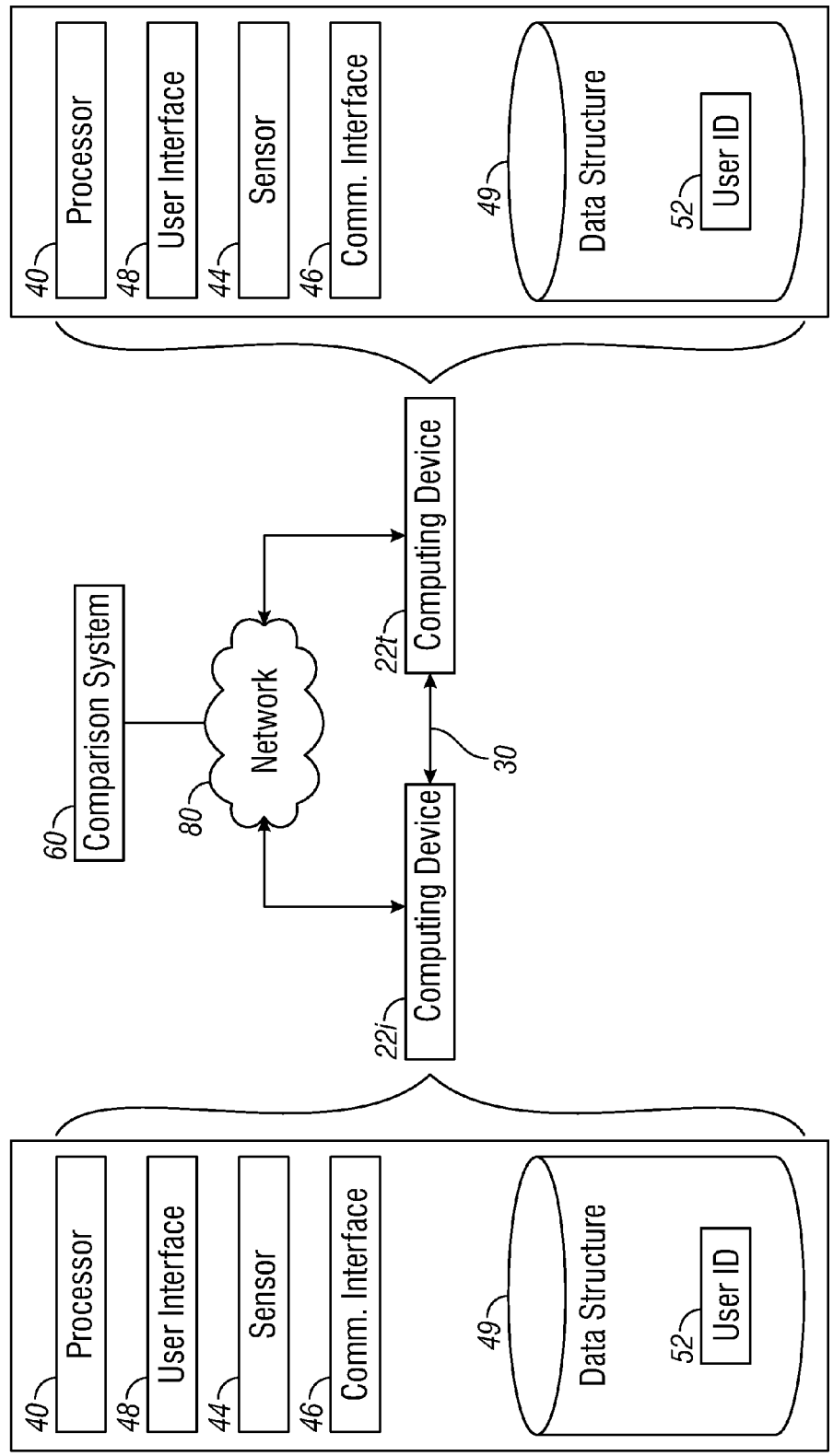
FIG. 1 shows an initiating communication device initiating communication with a target communication device over a wireless communication link.

FIG. 1 shows an initiating communication device 22 initiating communication with a target communication device 22 over a wireless communication link 30. The initiating communication device is referred to below as initiating device 22i, and the target communication device is referred to below as target device 22t. In order to initiate communication, an initiating device 22i may be moved into proximity to a target device 22t. Of course, in some cases both devices may be moved into proximity with one another.

Mobile communication devices 22i and 22t may be any of a wide variety of different devices. Non-exhaustive examples of mobile communication devices 22i and 22t include a laptop computer, a tablet computer, a mobile phone (e.g., a smart phone) and a netbook. Other communication devices, both mobile and non-mobile, are contemplated.

In some embodiments, the initiating device 22i may include a processor 110, a bump sensor 144, one or more communications interfaces 46, a data structure 49 for storing data including, for example, a user identifier 52 and a user interface 48. The bump sensor 44 may be, for example, a MEMS accelerometer or a piezoelectric sensor capable of detecting vector acceleration along three orthogonal x, y and z axes. Bump sensor 44 may be other sensors in further embodiments capable of sensing scalar or vector characteristics of motion and/or acceleration. In further embodiments, the initiating device 22i may further store an encryption key for use in an authentication process. The target device may have the same or fewer components, such as for example as shown in the target device 22t of FIG. 1. A more specific example of an illustrative communication will be described below in connection with FIG. 5.

Communication link 30 between the mobile communication devices 22i and 22t may be established over a short range wireless technology such as Near-Field Communication (NFC), for example. NFC technology involves two NFC-enabled devices being brought together in close proximity to transfer information. NFC operates using magnetic field induction at a frequency of, for example, 13.56 MHz and transferring data at up to 424 Kbits/second. NFC provides both read and write exchange of data between electronic devices. Of course, other short-range communication protocols may be employed, which typically allow communication to be established when two device are within a few (e.g. 2) meters or even within a few centimeters of one another.

Communication between two NFC-compatible devices occurs when the devices are positioned, for example, within about four centimeters of one another. As an example, an event initiated by a user with an NFC-equipped communication device can establish an NFC connection. In one implementation, the event may be a motion or touch (a "bump") with another NFC-equipped communication device. NFC communication technology operates according to accepted standards, such as International Standards Organization (ISO) and/or other telecommunications standards, including, for instance, ISO/IEC 18092, ISO/IEC 14443, ISO/IEC 15693 and ISO/IEC 21481.

One advantage arising from the use of NFC relative to other short-range wireless technologies is that two devices can automatically create a wireless communication link when they are brought into close proximity of each other. This enables information to be quickly shared between the devices. For example, in meetings, business card information can be easily shared by bringing NFC devices next to each other. The proximity restrictions allow NFC devices to discriminate amongst other NFC devices to control the flow of information without requiring the entry of codes or the selection of network or device names from a menu. The simple bumping or tapping together of the devices to initiate information exchange is both selective and intentional.

In some embodiments, in addition to communicating with one another over a short-range wireless link, one or both of the communication devices 22i and 22t may communicate with a comparison system 60 via one or more networks 80. For example, the network 80 may include any wired or wireless network including, but not limited to, the Internet, cellular networks, and Bluetooth wireless networks, or any combination thereof. The comparison system 60 may be implemented by one or more computing devices arranged to provide the functionality described herein. For example, the comparison system 60 may be implemented by multiple server machines. In some embodiments, the comparison system 60 is implemented as a cloud service.

As previously mentioned, the NFC protocol allows for the quick and easy exchange of information between devices. For example, individuals can easily exchange business card information with one another by bringing NFC devices next to each other. While this process is satisfactory when the two individuals are aware of the information they wish to exchange with each other, it is less useful when individuals do not know what if any information they wish to exchange with each other. For instance, if two individuals who do not know each other meet, they may wish to discover attributes or personal information that they have in common such as common friends, contacts, hobbies and other interests and so on. Although information detailing such commonly-shared attributes may be available on their respective mobile communication devices or from their social network profiles or from other sources, there is no simple way for the individuals to discover them.

In one implementation, when two mobile communication devices establish communication with each other in response to an event (e.g., a "bump") using an NFC protocol or another short-range communication technology, information is exchanged to identify the owners of the devices. That is, in the example of FIG. 1, the owner of mobile communication device 22i provides identifying information to the owner of mobile communication device 22t and the owner of mobile communication device 22t provides identifying information to the owner of mobile communication device 22i. One or both of the devices then send the identifying information to the comparison system 60 over the network 80.

In some implementation only one of the mobile devices may have the functionality needed to communicate with the comparison system 60 and obtain attributes that the two users have in common. For instance, in one particular implementation a first device without this functionality may send its contact card information in a known manner to a second device that is equipped with the capability to cause the comparison process to be performed. The second device may acquire identity information from the contact card and send it, along with its own identity information, to the comparison system 60.

The comparison system 60 uses each identifying information item to locate any available attributes concerning each of the owners. Such attributes may be available from a variety of sources. For example, the attributes, which may include, for instance, friends, colleagues, interests, hobbies, past work experience, location information, photos taken in a common location, status messages obtained from a common location, and so on, may have been previously backed-up up from the mobile communication devices to the comparison system 60. Alternatively, or in addition thereto, the comparison system 60 may use the identifying information to locate social networking sites or the like from which attributes concerning the owners may be obtained. Regardless of how access to the attributes associated with each user is obtained, the comparison system 60 may compare the personal information from both users to identify anything the users have in common.

Figure 2:
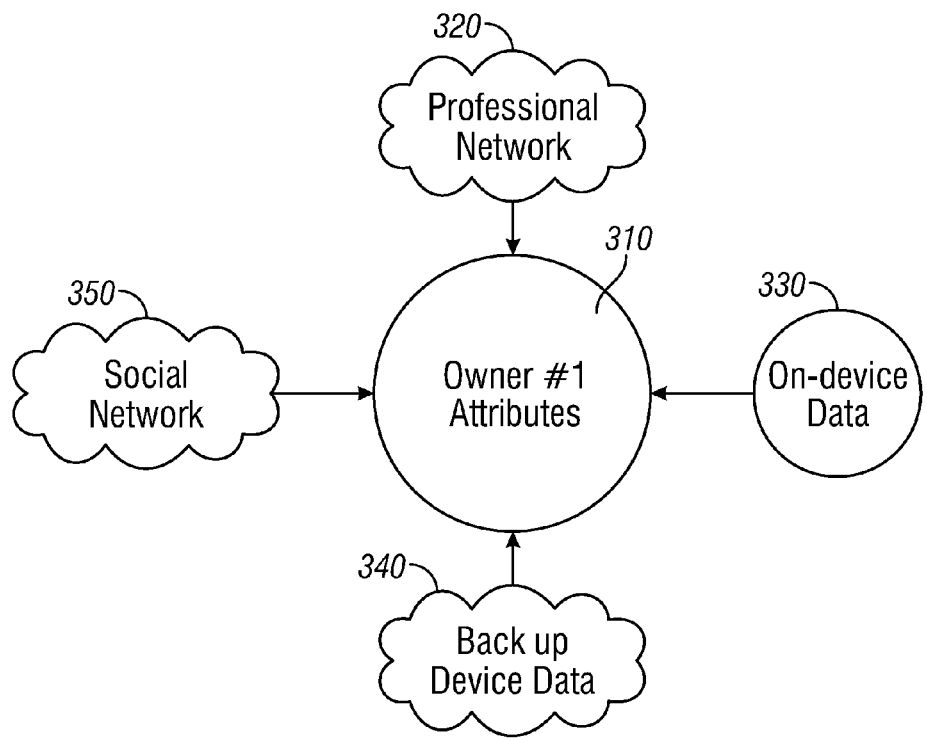
FIG. 2 is a logical diagram illustrating various sources of information that may be used by the comparison system to obtain user attributes.
Figure 3:
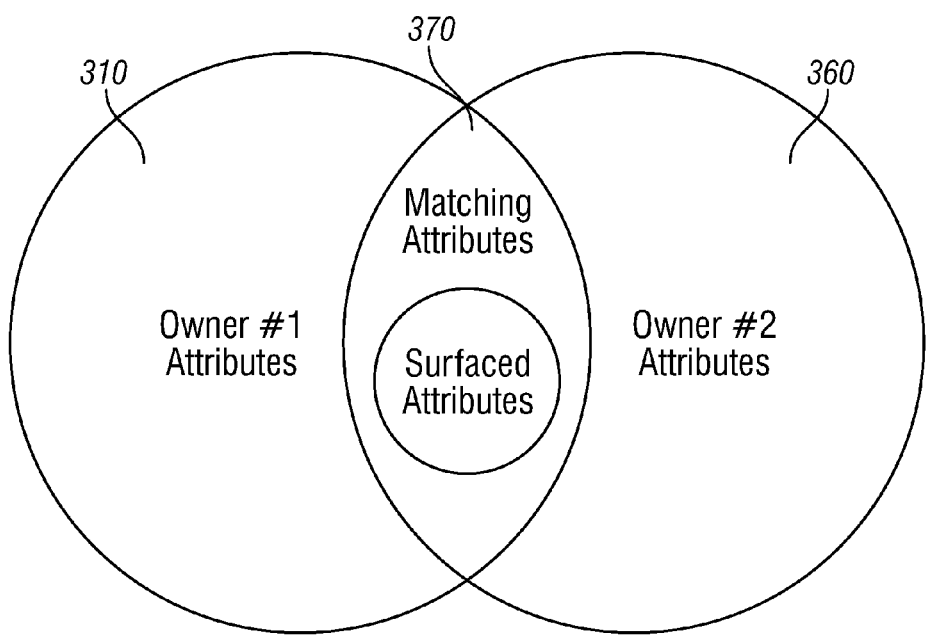
FIG. 3 is a logical diagram illustrating the attributes which have been obtained for users 1 (one) and 2 (two) of the communication devices shown in FIG. 1.

The aforementioned process of obtaining matching attributes is summarized with reference to FIGS. 2 and 3. FIG. 2 is a logical diagram illustrating various sources of information that may be used by the comparison system 60 to obtain user attributes 310. As shown, such sources include, without limitation, information 330 stored on the devices themselves, data 340 backed-up from the devices (e.g., on the comparison system), social networks 350 and professional networks 320 (including, for instance, publically accessible professional networks such as LinkedIn as well as internal corporate networks and the like). FIG. 3 is a logical diagram illustrating the attributes which have been obtained for user 1 of device 22i and the attributes which have been obtained for user 2 of device 22t. The intersection of the attributes defines the matching or commonly shared attributes which can be surfaced to the users on their respective communication devices.

The comparison system 60 may identify attributes common to both users in a variety of different ways, ranging from simple key word matching to more complex techniques which identify more subtle commonalities. When such techniques are employed the comparison system 60 may refer to additional databases such as domain-specific ontology databases, for instance, which allow the comparison system 60 to obtain contextual information using ontology-based, semantic techniques. For instance, as a simple example, if the comparison system 60 obtains an attribute for one user indicating that she likes Italian restaurants and obtains an attribute from another user specifying the name of a particular Italian restaurant, the comparison system 60 may be able to infer that one thing both users have in common is a liking of Italian food.

Once the attributes which the users have in common are identified, the comparison system 60 sends the matching information to one or both mobile communication devices 22i and 22t over the network 60. Each device may then display or otherwise present the information to the user in any appropriate manner. For instance, the devices may present basic contact information for each user in the form of a contact card, which may be customized to show the attributes that the users have in common. If, for example, the matching system 60 has determined that both users attended the same college, the contact card may include a picture of the school mascot. As another example, if both users attended the same concert, the contact cards that are exchanged may include a photo from the concert. In this way the two parties, who may have been unknown to each other prior to the exchange of information, may easily begin a conversation based on their common interests which they did not know they shared.

In some embodiments, the user interfaces associated with the mobile communication devices may allow the users to specify user preferences for configuring the operation of the social connection services. For instance, the service may allow users to specify criteria which determines those attributes, or classes of attributes, that should and should not be used as part of the comparison process. By way of example, the users may specify what type of information is to be shared based on the nature of their relationship. For instance, if the users are determined to be work colleagues, one of the users may specify that only those attributes obtained from professionally-oriented social networks (e.g., LinkedIn) are to be used in the comparison process, as well as other attributes associated with other work colleagues that may be available, from, say, an address book or a list of contacts stored on the user's mobile communication device.

As a concrete example, assume that when two devices establish communication with one another after the occurrence of an event such as a bump, it is determined that the users have the following attributes in common:
  5 common friends
  1 common workplace
  2 common check-ins—one at a restaurant, one at a theater on the same night
  1 common music group listed in their interests on a social network In this case, the comparison system 60 may use a priority list, specified by the users, to surface or otherwise present to the users one common friend and the checkin at the theater on the same night. The system might also introduce some randomness, so that if the users bumped phones again at some other time, they might get different matches returned to them. Moreover, depending on user preferences, the system may also display different results to each of the users. In some cases users may be able to provide feedback concerning the attributes they receive from the comparison system. For instance, users may indicate which attributes they are most interested in and which they have little or no interest in. In this way the comparison system can "learn" which attributes individual users are most interested in and least interested in and adjust the attributes it returns accordingly.

Figure 4:
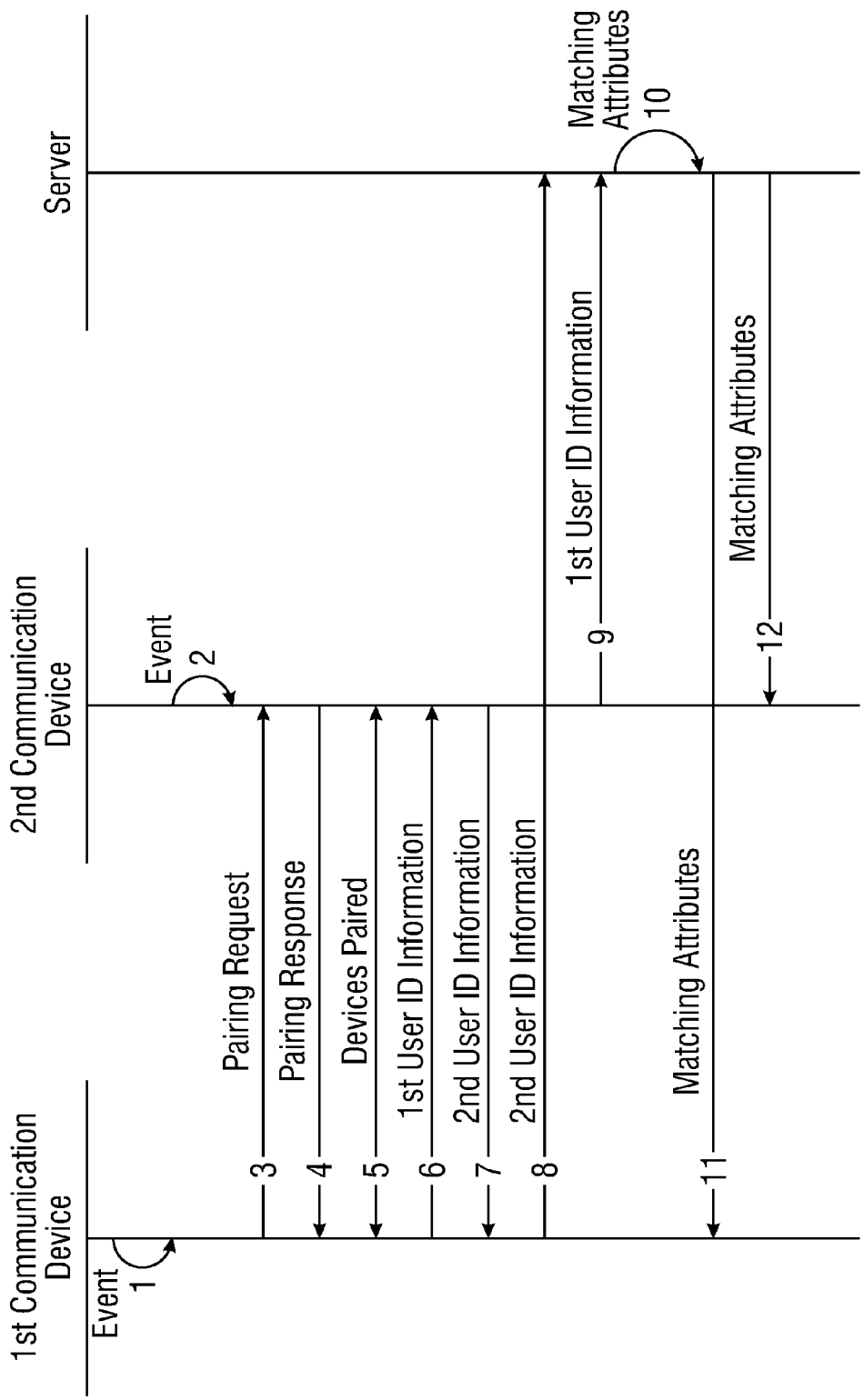
FIG. 4 is a message flow diagram illustrating one example of the messages that may be exchanged between two communication devices and a server when the two devices exchange information over a short-range communication link.

FIG. 4 is a message flow diagram illustrating one example of the messages that may be exchanged between two communication devices and a server when the two devices exchange information over a short-range communication link. In this example the event which initiates the exchange of information is a bumping of one device against another. Of course, as previously mentioned, in other implementations different events may be used to trigger the information-exchange process.

Referring now to FIG. 4, at 1, an event occurs when a first communication device bumps against a second communication device. The second communication device detects the bump at 2. In one embodiment, both devices create a timestamp when the bump occurs. At 3, the first communication device (or, alternatively, the second communication device) may send out a pairing request to any devices in range to see if such devices logged a bump at the same time or substantially the same time. If a device responds at 4 that it received a bump at the same or substantially the same time, it may be inferred that this was the target device bumped and the devices may pair in order to establish communication at 5. The pairing process may occur in accordance with technologies made available by the particular short-range communication protocol (e.g., NFC) that is employed.

Once the devices have established communication with one another, one of the devices transmits user identity information to the other. In this example the first communication device transmits its user identity information to the second communication device at 6. In response, the second communication device transmits its user identity information to the first communication device at 7.

Next, at 8, the first communication device transmits the second user identity information, which it has just received, to the server. Likewise, at 9, the second communication device transmits the first user identity data, which it also has just received, to the server. Of course, in other implementations, depending in part on their capabilities, each communication device may send its own user identity information to the server, or, alternatively, one (or both) of the devices may send both user identities to the server. In some cases, if each user sends their own identity information, they may also need to send a separate identifier that is uniquely associated with both users. Such a common identifier may be generated, for example, at the time the user first exchange information with one another. The common identifier may be unique to the pair of users (so that it can be used when a subsequent event triggers the information-exchange process) or it may be unique to the particular event (e.g., a bump) for which it is generated. In this implementation the two devices do not necessarily need to exchange user identity information with one another.

Once the server has received the user identity information from both devices it can perform the matching process at 10 in the manner discussed above. As previously mentioned, the server may access a wide variety of different information sources in order to obtain attributes of both users. Finally, at 11 at 12, the server sends the attributes which both devices have in common to the first and second communication devices, respectively.

In the embodiments discussed above the communication devices exchange information using a short-range communication protocol such as NFC. In other embodiments, however longer-range communication protocols may be employed in combination with location information for the two devices. The location information can be used to determine when the two devices are within proximity of one another. Such longer-range communication protocols may include, for example, Wi-Fi, cellular, Bluetooth and the like. When one or both devices determine that the two communication devices are within proximity of one another the devices initiate communication with one another over the longer range-communication protocol. In this embodiment the event which triggers the initiation of the communication process may be, for example, the determination that the two devices are within a specified distance of one another. Of course, alternative or additional events may also be employed.

Location information concerning the two communication devices may be obtained in any of a variety of ways, which may in part depend on the capabilities of the communication devices. For instance, a Global Positioning System (GPS) may be employed if the communication devices are equipped with a GPS receiver, which is capable of updating a device's location on a real or near real-time basis. Alternatively (or in addition thereto), the communication devices may be equipped with a device location module which obtains location information using other positioning technologies such as cell tower triangulation and Wi-Fi location systems, for example. The two communication devices which are to exchange information with one another may or may not employ the same positioning technologies.

If a longer-range communication protocol is employed along with a positioning technology, the maximum distance between the two devices at which communication is established between them to initiate the exchange of information will generally not be limited by the communication protocol. In this case the maximum distance may be fixed by the system or, alternatively, it may be a user-adjustable parameter. In either case a typical distance may range, for example, from a few centimeters to a few meters. Of course, greater distances may also be employed, which may allow two communication devices to exchange information, for instance, over distances that span a room or even multiple rooms within a building.

Figure 5:
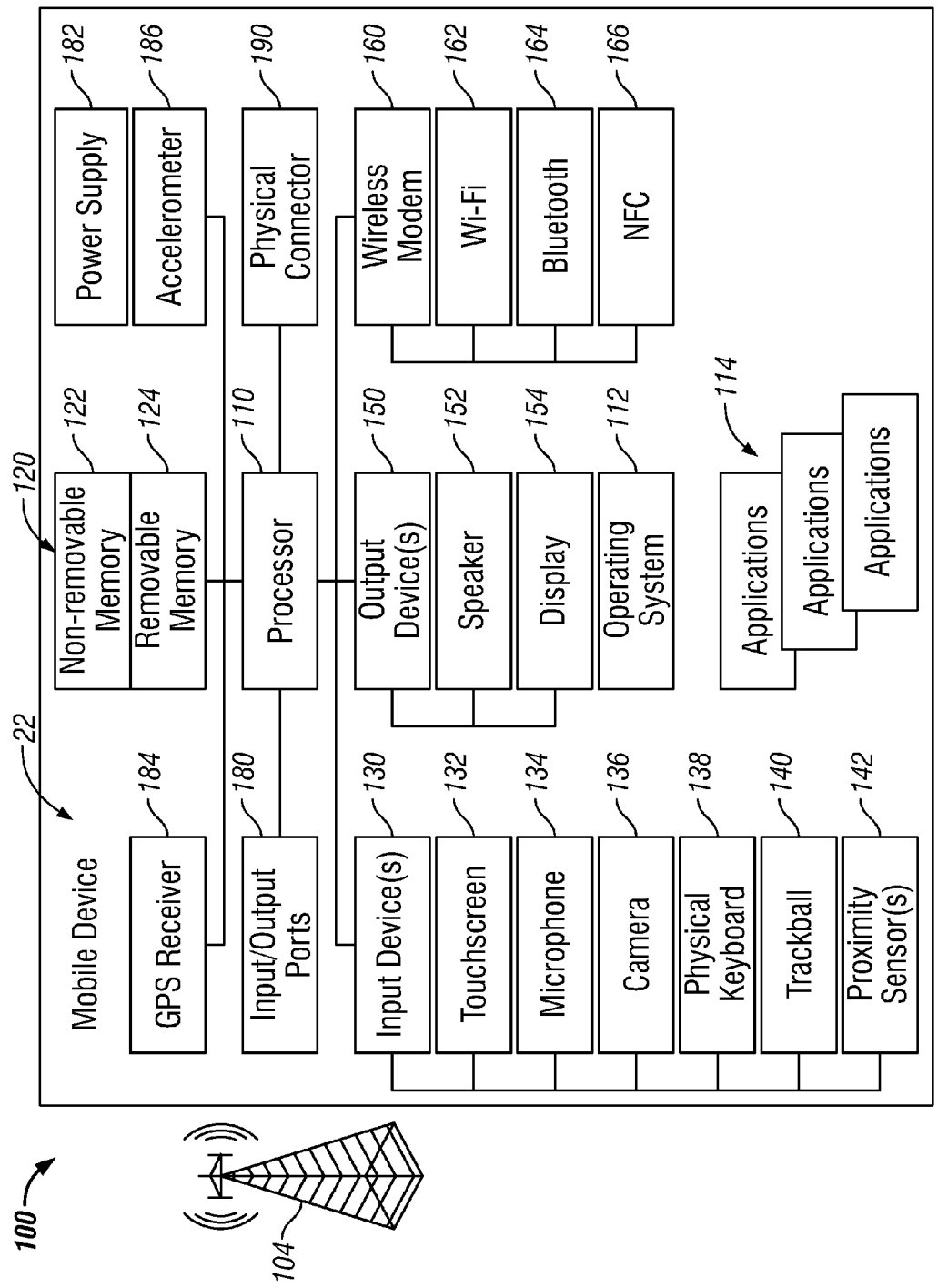
FIG. 5 is a system diagram depicting an exemplary communications device.

FIG. 5 is a system diagram depicting an exemplary communications device 22*i* and/or 22*t* (e.g., a mobile device) including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, tablet or other handheld computer, Personal Digital Assistant (PDA), smartwatch etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102, including power states, above-lock states, and below-lock states, and provide support for one or more application programs 114. The application programs can include common mobile computing applications (e.g., image-related applications, email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130 for responding to inputs from users and other sources. Such input devices may include a touch screen 132, microphone 134, camera 136, physical keyboard 138, trackball 140, and/or proximity sensor 142, and one or more output devices 150, such as a speaker 152 and one or more displays 154. Other possible output devices (not shown) can include piezoelectric or haptic output devices. Some devices can serve more than one input/output function. For example, touch screen 132 and display 154 can be combined into a single input/output device.

In some implementations the various input devices 130 may support natural user interface (NUI) methods. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies on which Microsoft® is working include touch sensitive displays, voice and speech recognition, intention and goal understanding, motion gesture detection using depth cameras (such as stereoscopic camera systems, infrared camera systems, red-green-blue (rgb) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

A wireless modem 60 can be coupled to an antenna (not shown) and can support two-way communications between the processor 110 and external devices, as is well understood in the art. The modem 60 is shown generically and can include a cellular modem for communicating with the mobile communication network 104 and/or other radio-based modems (e.g., Bluetooth 164 or Wi-Fi 162). The wireless modem 60 is typically configured for communication with one or more cellular networks, such as a GSM network for data and voice communications within a single cellular network, between cellular networks, or between the mobile device and a public switched telephone network (PSTN). The mobile device also includes an NFC component 166.

The mobile device can further include at least one input/output port 180, a power supply 182, a satellite navigation system receiver 184, such as a Global Positioning System (GPS) receiver, an accelerometer 186, a gyroscope (not shown), and/or a physical connector 190, which can be a USB port, IEEE 1394 (FireWire) port, and/or RS-232 port. The illustrated components 102 are not required or all-inclusive, as any components can be deleted and other components can be added.

The functionality of the comparison system that is resident on the communication device may be implemented in hardware, software or a combination of hardware and software. For example, when software is employed, the functionality may be implemented as part of the operating system 112, an application program 114, or it may be distributed between the operating system 112 and an application program 114. Additionally, accelerometer 186 may be used when the event which triggers the comparison process is a bump.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The techniques and solutions described in this application can be used in various combinations to provide an improved user experience with communication devices, including mobile devices such as smart phones.

Any of the methods described herein can be performed via one or more computer-readable storage media (e.g., storage or other tangible media that is not a signal bearing medium) comprising (e.g., having or storing) computer-executable instructions for performing (e.g., causing a computing device to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims.

The invention claimed is:

1. A method at a first communication device for exchanging information with a second communication device, comprising:

communicating first identity information from the first communication device to the second communication device over a short-range communication link in response to an event and receiving second identity information from the second communication device over the short-range communication link, the first identity information identifying a user of the first communication device and the second identity information identifying a user of the second communication device;

providing the first identity information and the second identity information to a comparison system over a communications network;

obtaining information from the comparison system that is arranged for comparing attributes associated with the first identity information and the second identity information and for specifying at least one attribute of the first and second users that they have in common; and displaying the information on a user interface to show the at least one common attribute, the user interface further providing user-selectable options for controlling which associated attributes are compared by the comparison system and for controlling the displaying of the information on the user interface.

2. The method of claim 1 in which the at least one attribute is selected from the group consisting of a friend, contact, hobby, interest, work experience, professional experience and an event, venue or other location that was attended or visited.

3. The method of claim 2 in which the short-range communication link is an NFC link.

4. The method of claim 3 in which the event is a bump between the first and second communication devices.

5. The method of claim 1 further comprising receiving a contact card from the second user over the short-range communication link, the contact card indicating the at least one attribute that the first and second users have in common.

6. The method of claim 5 in which the contact card is displayed on a display of the first communication device.

7. The method of claim 1 further comprising specifying one or more criteria that determine if a given attribute of the first user is to be matched to attributes of the second user when the at least one common attribute of the first and second users is being determined.

8. The method of claim 7 in which the one or more criteria include a relationship between the first and second users.

9. The method of claim 1 in which obtaining the information specifying the at east one attribute further comprises:

communicating to the second communication device over the short-range communication link information identifying one or more attributes of the first user;

receiving from the second communication device over the short-range communication link information identifying one or more attributes of the second user; and comparing the one or more attributes of the first user to the one or more attributes of the second user to determine the at least one attribute of the first and second users that they have in common.

10. A method performed by a comparison system for identifying and sharing attributes that a first user of a first mobile communication device has in common with a second user of a second mobile communication device after the first and second mobile communication devices exchange user identity information with one another over a short-range communication link, comprising:

receiving at the comparison system, over a communications network, first user identity information from a second mobile communication device and second user identity information from a first mobile communication device, the first user identity information identifying a user of the first mobile communication device and the second user identity information identifying a user of the second mobile communication device;

receiving control data generated at a user interface of the first or second mobile communication device, the user interface providing options for controlling which attributes are compared by the comparison system and for controlling display of information on the user interface;

based on the first and second user identity information, accessing a plurality of attributes associated with the first and second users;

comparing the plurality of attributes of the first user to the plurality of attributes of the second user to identify at least one attribute of the first and second users that they have in common, the comparing being performed responsively to the control data; and sending information identifying the at least one attribute to the first and second mobile communication devices over a communications network, the information being displayed on the user interface.

11. The method of claim 10 in which accessing the plurality of attributes of the first and second users includes accessing the plurality of attributes from one or more social networking sites or professional network sites.

12. The method of claim 10 in which accessing the plurality of attributes of the first and second users includes accessing the plurality of attributes from information backed-up from the first and second mobile communication devices.

13. The method of claim 10 in which the at least one attribute is selected from the group consisting of a friend, contact, hobby, interest, work experience, professional experience and an event, venue or other location that was attended or visited.

14. The method of claim 10 in which the short-range communication link is an NFC link.

15. A first communication device comprising:

a communications interface configured to send first identity information from the first communication device to a second communication device over a short-range communication link in response to an event and to receive second identity information from the second communication device over the short-range communication link, the first identity information identifying a user of the first communication device and the second identity information identifying a user of the second communication device;

the communications interface further configured to, based on the first and second identity information and in response to the event, send the second identity information to a server over a communications network, and receive information specifying at least one attribute of the first and second user that they have in common from the server over the communication network.

16. The communication device of claim 15 which the event is a bump in which the first and second communication devices physically contact one another and the short-range communication link is an NFC link.

17. The communication device of claim 15 further comprising a user interface configured to provide user-selectable options for controlling which associated attributes are compared by a comparison system at the server.

18. The communication device of claim 15 wherein the user-selectable options determined through the user interface specify one or more criteria that determine if a given attribute of the first user is to be matched to attributes of the second user when the at least one common attribute of the first and second users is being determined.

19. The communication device of claim 15 in which the at least one attribute is selected from the group consisting of a friend, contact, hobby or other interest, work or professional experience and an event, venue or other location that was attended or visited.

* * * * *